UNITED STATES PATENT OFFICE.

JAMES WHITCOMB, OF CORUNNA, MICHIGAN, ASSIGNOR OF ONE-HALF TO WILLIAM H. WILSON, OF CORUNNA, MICHIGAN, AND ONE-HALF TO W. SCOTT LOCKWOOD, OF LANSING, MICHIGAN.

ELECTROLYTE FOR PRIMARY BATTERIES.

No. 918,623.　　　Specification of Letters Patent.　　　Patented April 20, 1909.

Application filed November 27, 1907, Serial No. 404,152.　Renewed September 29, 1908.　Serial No. 455,303.

*To all whom it may concern:*

Be it known that I, JAMES WHITCOMB, a citizen of the United States, residing at Corunna, in the county of Shiawassee and State of Michigan, have invented a new and useful Electrolyte for Primary Batteries, of which the following is a specification.

This invention relates to electrolytes for primary batteries.

The object of the invention is to provide an electrolyte which shall be easy to compound, which will not cause fouling of the electrodes, and which may be used either with dry or wet batteries.

With the above and other objects in view, the invention consists in the novel electrolyte for primary batteries, hereinafter described and claimed.

In carrying the invention into effect the following ingredients are employed substantially in proportions specified and are thoroughly incorporated before used: Potassium bichromate, one and one-half ounces, sodium chlorid, one and one-half ounces, acetic acid, four drams, acidulated water, four ounces, consisting of three and one-half ounces of water and one-half ounce of sulfuric acid, aluminum hydroxid, four drams, charcoal, four ounces.

This electrolyte is used in the same manner as ordinary electrolytes, and will be found to possess the highest properties for developing an electric current.

Having thus described the invention what is claimed is:—

1. The herein described electrolyte for primary batteries consisting of potassium bichromate, sodium chlorid, acetic acid, acidulated water, aluminum hydroxid, and charcoal, substantially in proportions specified.

2. The herein described electrolyte for primary batteries consisting of potassium bichromate, one and one-half ounces; sodium chlorid, one and one-half ounces; acetic acid, four drams; acidulated water, four ounces, aluminum hydroxid, four drams; and charcoal, four ounces.

In testimony that I claim the foregoing as my own, I have hereto affixed my signature in the presence of two witnesses.

JAMES WHITCOMB.

Witnesses:
　A. D. COLE,
　N. GOODYEAR.